United States Patent [19]
Taguchi et al.

[11] 4,121,231

[45] Oct. 17, 1978

[54] EXPOSURE FACTOR SETTING DEVICE FOR A CAMERA

[75] Inventors: Tatsuya Taguchi, Tokyo; Nobuaki Date, Kawasaki, both of Japan

[73] Assignee: Canon Kabushiki Kaisha, Tokyo, Japan

[21] Appl. No.: 771,385

[22] Filed: Feb. 23, 1977

[30] Foreign Application Priority Data

Mar. 1, 1976 [JP] Japan .................................. 51/21910

[51] Int. Cl.$^2$ ............................................. C03B 7/08
[52] U.S. Cl. ..................................... 354/38; 354/23 D; 354/60 L
[58] Field of Search .............. 354/23 D, 50, 51, 60 R, 354/60 E, 60 L, 38

[56] References Cited

U.S. PATENT DOCUMENTS

| 3,688,657 | 9/1972 | Veda ................................. 354/60 E |
| 3,949,412 | 4/1976 | Taguchi et al. ..................... 354/60 E |
| 4,011,569 | 3/1977 | Mashimo et al. ....................... 354/38 |

*Primary Examiner*—Russell E. Adams
*Attorney, Agent, or Firm*—Toren, McGeady and Stanger

[57] ABSTRACT

An exposure factor setting device for a photographic camera comprising manually adjustable shutter speed and diaphragm aperture setting components, an indicator cooperative with a shutter speed scale and capable of responding to either of the outputs of the shutter speed setting component and an exposure value computer, and first and second gates connected respectively between the shutter speed setting component and the indicator and between the computer and the indicator and arranged to be acted on alternately in sequence by a common pulse generator. When the previously selected combination of shutter speed and diaphragm aperture is not correct in conformity with the prevailing scene brightness, the indicator is caused to flicker between two positions for the automatic and manual shutter speed values. To attain correct adjustment of shutter speed and diaphragm aperture, the photographer may operate with either of the shutter speed and diaphragm aperture setting components until the amplitude of flickering of the indicator is reduced to zero, while looking through the finder as the indicator is visible in or adjacent the finder image field.

16 Claims, 5 Drawing Figures

EXPOSURE FACTOR SETTING DEVICE FOR A CAMERA

BACKGROUND OF THE INVENTION

1. Field of the Invention

This invention relates to photographic cameras, and more particularly to a camera with an exposure factor setting device which enables the photographer to bring about correct adjustment of shutter time and diaphragm aperture in conformity with the prevailing scene brightness, while looking through the camera finder.

2. Description of the Prior Art

In setting into a camera a combination of exposure factors, namely, shutter speed and diaphragm aperture opening both manually adjusted to effect attainment of the correct exposure value in conformity with the prevailing scene brightness, it has been the prior art practice, at first, to manually select a desired diaphragm value on the diaphragm aperture setting component, then to read off an automatic shutter speed value from the deflected position of the pointer of an exposure meter within the field of view of the finder as a result of computation of the correct exposure value in accordance with the preselected diaphragm value and the prevailing scene brightness, and thereafter to manually adjust the shutter speed setting component to the automatic shutter speed value. During the manual setting of the shutter speed value, however, the photographer need to release his eye from looking through the finder. This method is, therefore, associated with such an inconvenience and time loss in providing the adjusted combination of shutter speed and diaphragm aperture.

It is known to provide a mechanically operated exposure factor setting device for a camera in which the pointer of the exposure meter is coordinated with a follow-up member as mechanically linked with the shutter speed dial so that when the follow-up member is brought into coincidence with the pointer by turning the shutter dial, at the same time correct adjustment of the shutter speed and diaphragm aperture in conformity with the exposure value based on the reading of the exposure meter is attained, while permitting the photographer to look into the finder throughout. This mechanical linkage between the shutter dial and the follow-up member is, however, complicated in structure.

SUMMARY OF THE INVENTION

An object of the present invention is to provide a photographic camera with an exposure factor setting device of simple structure and rendering it possible to obtain the adjusted combination of shutter speed and diaphragm aperture opening quickly.

Another object of the invention is to provide an electronically operated exposure factor setting device adapted for use in a camera of the type having an exposure meter.

Still another object of the invention is to provide an exposure factor setting device of the character described above adapted for use in a camera of the type having a digitaled exposure control circuit.

The features and advantages of the invention will become apparent from the following detailed description taken in conjunction with the accompanying drawings.

DETAILED DESCRIPTION OF THE PREFERRED EMBODIMENTS

Figure 1:
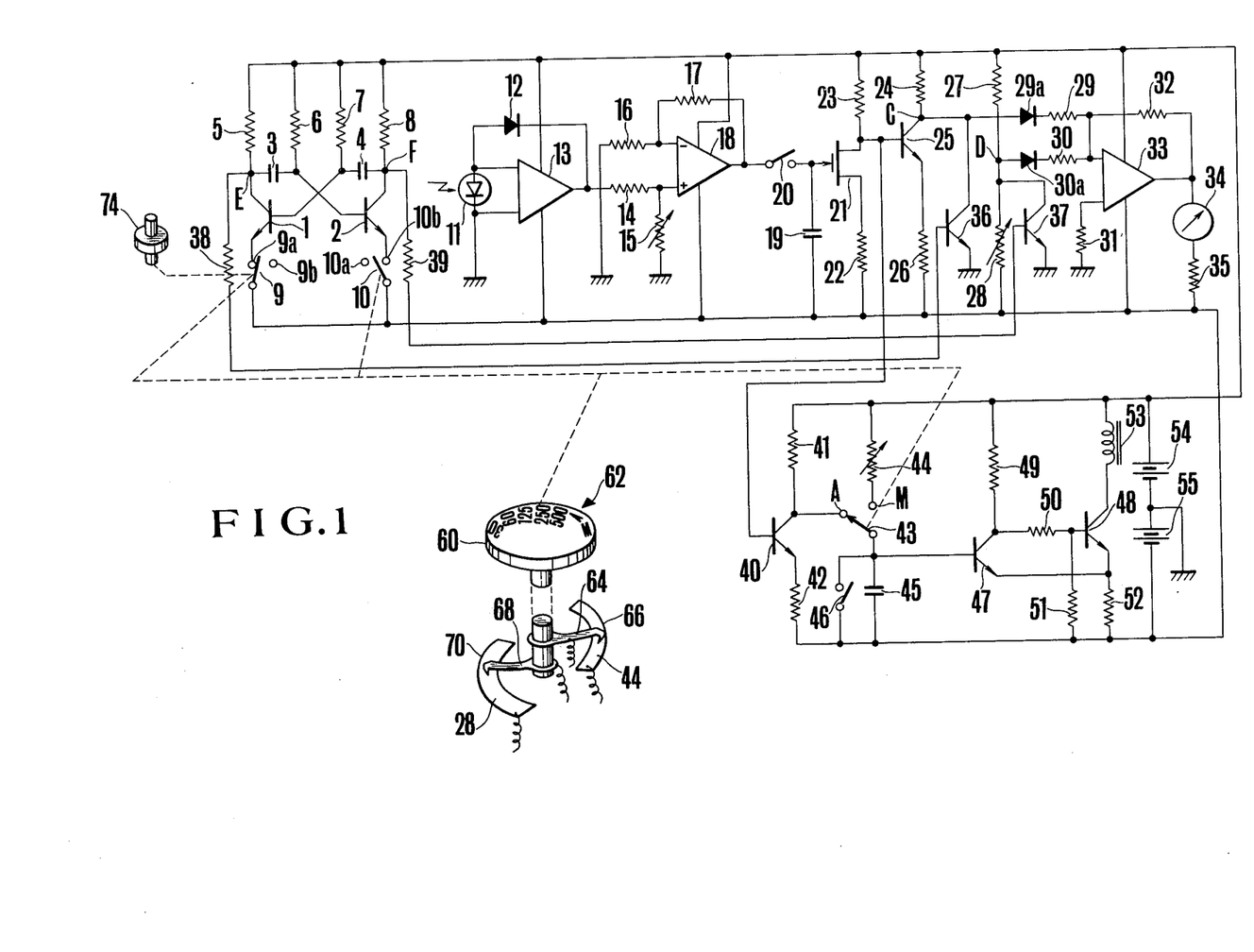
FIG. 1 is a schematic diagram of the circuitry of one embodiment of the exposure factor setting device according to the invention associated with an automatic exposure control circuit.

Referring to FIG. 1 there is shown an example of the circuit of an exposure factor setting device of the invention as associated with an automatic exposure time control circuit. The latter circuit comprises a light-sensitive element 11 such as a silicon photo-diode, an operational amplifier 13 with a feedback diode connected between the input and output of the amplifier 13 to produce a voltage proportional to the logarithm of the scene brightness (Bv), an exposure value computer, and a switching circuit receptive of the output of the computer and responsive to attainment of a threshold voltage level for actuating a shutter electromagnet 53. The computer comprises an operational amplifier 18 having a non-inversion input terminal connected to the output terminal of amplifier 13 through a resistor 14 and also to a variable resistor 15 of which the resistance value depends upon the combination of a pre-select diaphragm aperture value (Av) and the sensitivity (Sv) of the used film and which also serves to constitute part of the exposure factor setting device of the invention, and having an inversion input terminal grounded through a resistor 16, and a feedback resistor 17 connected between the inversion input and the output of amplifier 18. The output of the computer is applied through a normally closed switch 20 to a storage capacitor 19 at one pole thereof. This pole connected to the gate of a high input impedance field-effect transistor 21 having a source connected through a resistor 22 to the negative bus and having a drain connected to the positive bus through a resistor 23 and also to both of the exposure factor setting device and a shutter control circuit.

The shutter control circuit comprises a logarithmic elongation transistor 40 having a base electrode connected to the drain of field-effect transistor 21, and having collector and emitter stage resistors 41 and 42 respectively, a single pole-and-double throw switch 43 having two fixed contacts "A" and "M" connected respectively to the collector electrode of transistor 40 and to a shutter speed adjusting variable resistor 44 and arranged to cooperate with a shutter dial 60, a timing capacitor 45 connected between the movable contact of switch 43 and the negative bus, and a Schmitt type trigger circuit having a pair of transistors 47 and 48 with resistors 49 to 52. The base electrode of transistor 47 is connected to a point on connection between switch 43 and timing capacitor 45. Connected across timing capacitor 45 is a start switch 46 arranged to be opened when the leading curtain of shutter runs down to the exposure aperture fully open position. The collector electrode of transistor 48 is connected to the solenoid of electromagnet 53 so that upon de-energization, the tailing curtain of shutter runs down to close the exposure aperture. A power source, or a pair of batteries is indicated at 54 and 55.

The circuit of the exposure factor setting device of the invention comprises, in addition to the above-mentioned circuit elements 11 and 15, an indicator 34 in the form of an exposure meter having a pointer 34a (see FIG. 2) arranged in the field of view of the camera finder to cooperate with a shutter speed scale, a first gate circuit in the form of a transistor 36 connected between the output stage of the exposure value computer and the input stage of indicator 34, a second gate circuit in the form of a transistor 37 connected between the input stage of indicator 34 and a point on connection between a fixed resistor 27 and a variable resistor 28, the latter resistor serving as a shutter speed setting component, and a pulse generator in the form of an oscillator or astable multivibrator for causing alternate and successive application of the outputs of the computer and the shutter speed setting resistor 28 to the indicator 34.

The multivibrator has a pair of transistors 1 and 2 with a pair of respective timing capacitors 3 and 4 and resistors 6 and 7, the values of which are adjusted so that the period of the complete oscillation becomes 2 seconds, for example. The collector resistors are indicated at 5 and 8. The emitter electrode of transistor 1 is connected to the negative bus through a switch 9 arranged to remain closed when the shutter dial 60 is turned to place its symbol "A" (Automatic shutter speed) out of registry with a stationary index 62, but to be opened when a lock button 74 is depressed. The emitter electrode of transistor 2 is connected to the negative bus through a switch 10 arranged to be opened when the shutter dial 60 is turned to place the symbol "A" in registry with the index 62. Connected to the points "E" and "F" on connection between transistor 1 and resistor 5 and between transistor 2 and resistor 8 are the respective base electrodes of the first and second gate circuit transistors 36 and 37 through respective resistors 38 and 39.

The input stage of indicator 34 includes an operational amplifier 33 having an output terminal connected to the winding of meter 34, a feedback resistor 32 connected between one of the input terminals and the output terminal of the amplifier 33, the other input terminal being grounded through a resistor 31. The first-named input terminal of amplifier 33 is connected both to a point "C" on connection between a resistor 24 and the collector electrode of an amplification transistor 25 at which point appears a voltage representative of the exposure value, in this instance, the automatic shutter speed value as the base electrode of transistor 25 is connected to the point on connection between the resistor 23 and transistor 21, through series-connected resistor 29 and diode 29a, and to a point "D" on connection between the resistor 27 and the shutter speed setting variable resistor 28 through series-connected resistor 30 and diode 30a. The diodes 29a and 30a serve to prevent the first and second gates 36 and 37 from being brought into action when the respective complementary gates are acted on.

An example of the arrangement and construction of the first and second shutter speed setting variable resistors 44 and 28 is schematically shown in FIG. 1. The first variable resistor 44 comprises a slider 64 radially extending from the shaft of the dial 60 and arranged to move slidably on an arcuate resistance track 66, while the second variable resistor 28 comprises a slider 68 radially extending from the common shaft of the slider 64, spaced therefrom by an angle of about 180° and arranged to move slidably on an arcuate resistance track 70.

The operation of the circuit of FIG. 1 is as follows. When manual adjustment of shutter speed and diaphragm aperture is to be made in conformity with the exposure value based on the reading of the exposure meter or indicator, the photographer may at first turn the diaphragm ring of the camera objective to set into the variable resistor 15 a desired diaphragm value (Av) in combination with the preset film speed value (Sv), and then bring about alignment of the camera to a scene which he desires to photograph, while looking through the finder. The light from the scene after entering through the objective lens (not shown) is incident upon the light sensitive element 11 and causes a voltage to be generated, the level of which depends upon the brightness of the scene. This voltage after compressed by the diode 12 is combined with the voltage derived from the film speed and diaphragm value setting resistor circuit 15 in the computer including the operational amplifier 18, and the combined voltage is applied through the switch 20 to the storage capacitor 19, being representative of the correct exposure value, in this instance, automatic shutter speed value. It is noticed that the switch 20 is opened when a reflex mirror not shown is moved upward.

Figure 2:
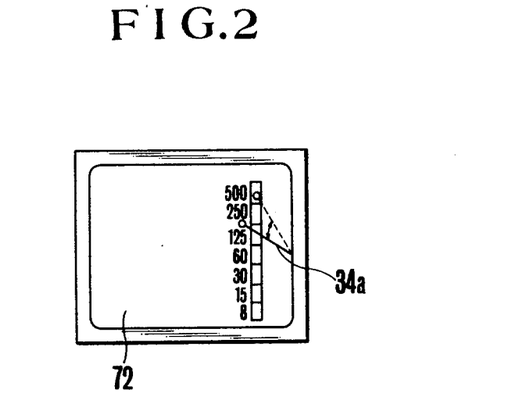
FIG. 2 is a plan view on an enlarged scale of the field of a viewfinder with the exposure meter pointer of FIG. 1 appearing to an observer looking through the finder.

Now assuming that the automatic shutter speed is 1/125 second and that the shutter dial is previously set in "A" position for index 62, the switch 10 is open while switch 9 is closed, so that the voltage stored on capacitor 19 is continuously applied to the indicator 34 whereby the pointer 34a is deflected to a position shown by a solid line in FIG. 2 as appearing in the field of view of the finder 72. Further assuming that the symbol A is located just beyond the upper limit of an available shutter speed range, for example, 1/500 second, when the photographer turns the shutter dial 60 clockwise to place a graduation of 500 in alignment with the index 62, while continuing to look through the finder 72, the switch 10 is closed so that the unstable multivibrator starts to oscillate. Upon occurrence of a first pulse of rectangular waveform, the first gate circuit or switching transistor 36 which has so far been in the non-conducting state is turned on, and at the same time, the second gate circuit or switching transistor 37 is turned off, causing a voltage derived from the second shutter speed setting variable resistor 28 to be applied to the indicator 34 through diode 30a, resistor 30 and amplifier 33, with the result that the pointer 34a is deflected from the position for the automatic shutter speed value of 1/125 second to a position for the manual shutter speed value of 1/500 second. In a time interval of 1 second, the multivibrator is inverted, causing the pointer 34a to take again the position for the automatic shutter speed value of 1/125 second. Thus, in so far as the shutter dial 60 remains unchanged in setting, the pointer 34a is permitted to flicker between the positions for the automatic and manual shutter speed values of 1/125 and 1/500, as the outputs of the exposure value computer and the second shutter speed setting variable resistor are alternately applied to the indicator 34 in sequence. When the amplitude of flickering of the pointer 34a is reduced to zero by further turning shutter dial 60 to a position for 1/125 second, at the same time, correct adjustment of the shutter speed and diaphragm value is attained, conformity with the prevailing scene brightness level.

If the photographer has found the adjusted combination of the shutter speed and diaphragm aperture opening unacceptable for the contemplated picture, as, for example, not providing the desired depth of focus, or due to movement of the object of principal interest in the scene, then another combination of shutter speed and diaphragm aperture opening within the adjusted exposure value can be effected by reference to the deflected positions of the pointer 34a. Where the pointer 34a flickers between two positions, if the photographer desires to be informed which position is for the manual shutter speed value, then the lock button 74 is depressed to open the switch 9, thereby the first switching transistor 36 is turned on, and the second switching transistor 37 is turned off causing cooperation of the variable resistor 28 with the indicator 34.

After the exposure factor setting procedure has been completed, a shutter release button not shown will be depressed to make an exposure with a manual shutter speed value of 1/125, thereby the diaphragm mechanism provided in the objective lens mount is adjusted to the presetting made at the resistor 15, and then the mirror is moved upward with simultaneous opening of switch 20. At the termination of upward movement of the mirror, the leading shutter curtain runs down to the exposure aperture fully open position where the start switch 46 is open. As the shutter dial 60 is in the position for the shutter speed of 1/125 second, and, therefore, switch 43 is in "M" position, the output voltage of the RC timing circuit 44, 45 begins to increase, reaching a level termed the trigger voltage for the Schmitt type trigger circuit in a time interval of 1/125 second after the opening of switch 46. When the trigger circuit is actuated, transistor 48 is turned off to de-energize electromagnet 53, causing the tailing shutter curtain to run down to terminate the exposure.

When an exposure with an automatic shutter speed is to be made, the shutter dial 60 will be turned to place the symbol "A" in registry with index 62, thereby switch 10 is set from "10b" position to "10a" position and switch 43 is set from "M" position to "A" position. Upon opening of start switch 46, therefore, the timing capacitor 45 begins to be charged through resistor 41 at a voltage ramp, the slope of which is a function of the exposure value stored on the storage capacitor 19. Before the opening of start switch 46, this exposure value can be ascertained by the indicator pointer 34a as cooperating with the shutter speed scale in the field of view of the finder 72 (see FIG. 2). At this time, as switch 9 remains closed and switch 10 is open, gate circuit transistors 36 and 37 are in the non-conducting and conducting states respectively, where the output stage of computer is connected to the input stage of indicator 34, while the manual shutter speed setting resistor circuit 27, 28 is cut off therefrom. If the photographer desires to vary the automatic shutter speed, he may turn the diaphragm ring while looking through the viewfinder 72.

The present invention has been described in connection with a specific example as applied to the diaphragm preselection automatic exposure time control system, but is applicable to the shutter preselection automatic diaphragm aperture control system in which the diaphragm ring may turn to follow up the exposure value or automatic diaphragm value. In the latter connection, it should be explained that the switch 10 of multivibrator must be changed in arrangement to cooperate with the diaphragm ring but not with the shutter dial, and that the shutter dial and film speed dial are associated with a common variable resistor arranged in a position corresponding to that of the resistor 15, and further the diaphragm ring is associated with the resistor 28 while the resistor 44 remains unchanged from the arrangement for cooperation with the shutter dial.

Figure 3:
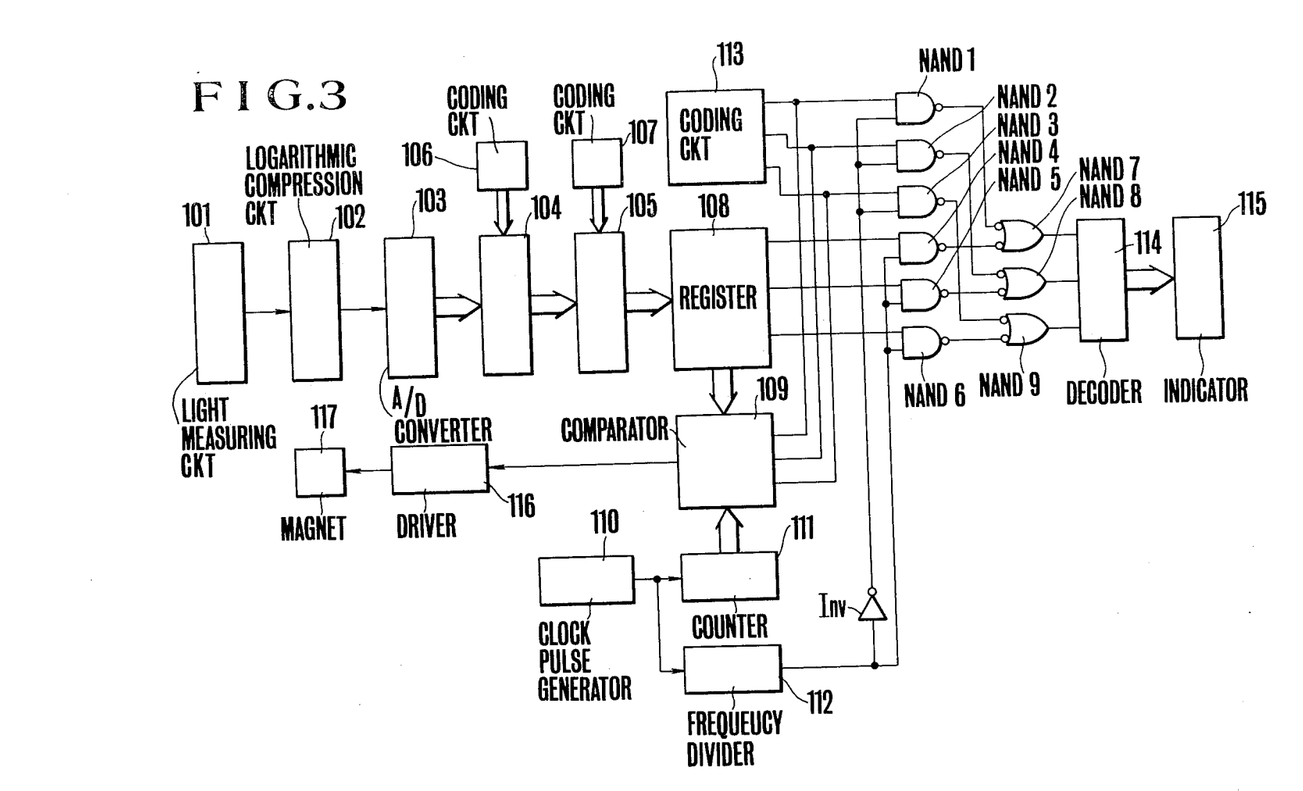
FIG. 3 is a block diagram of another embodiment of the present invention applied to a digitalized camera.
Figure 4:
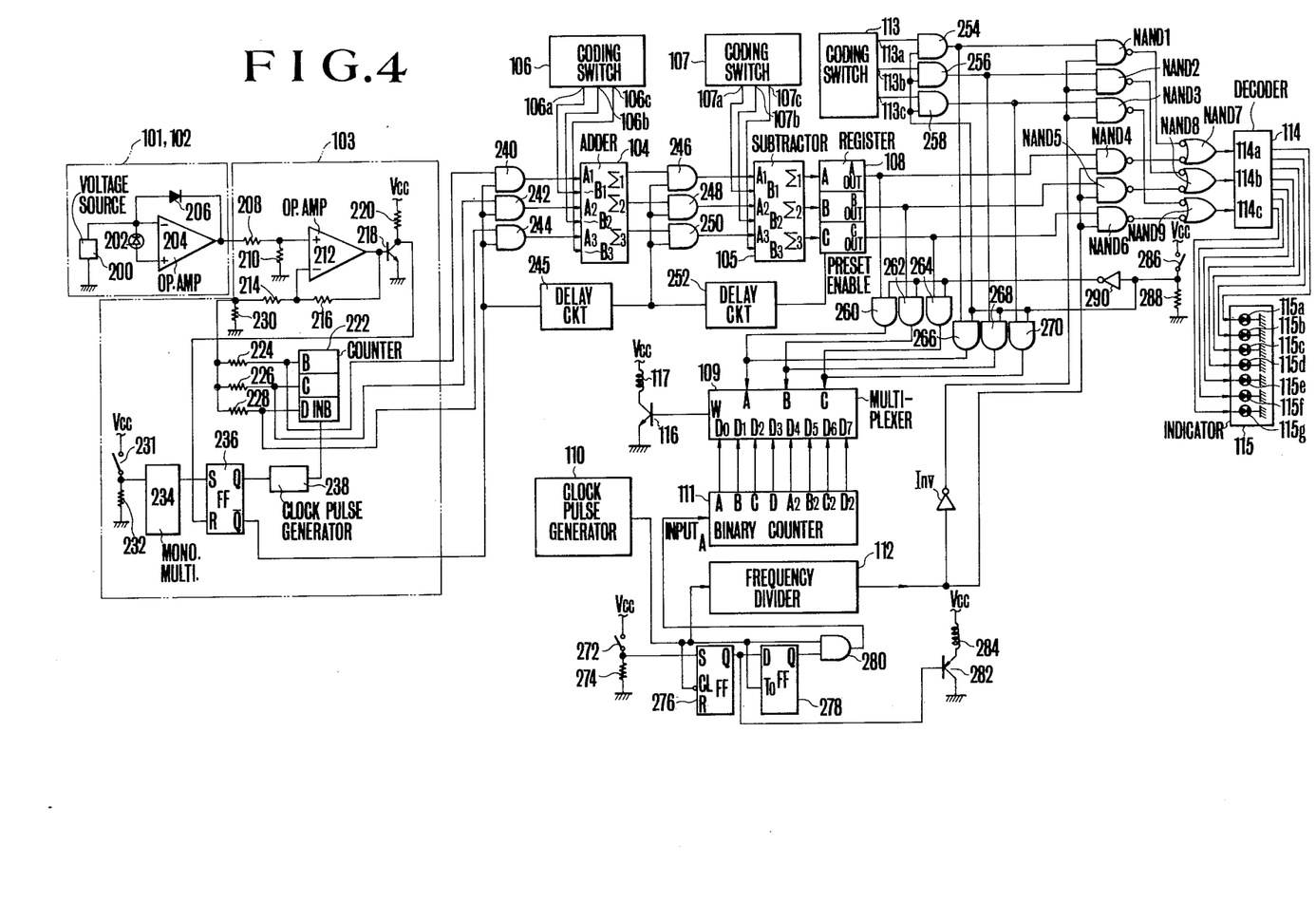
FIG. 4 shows the details of the circuit of FIG. 3.
Figure 5:
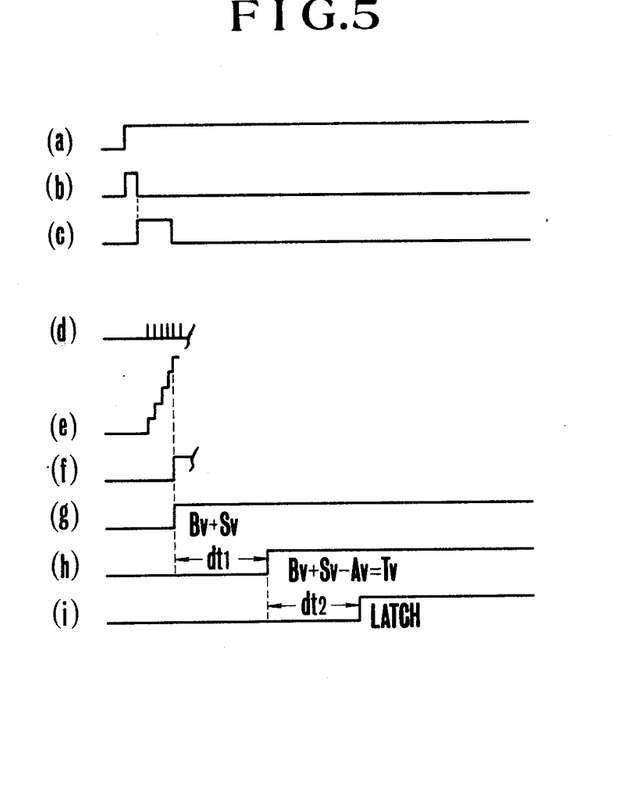
FIG. 5 is a voltage-versus-time chart showing the voltages at various portions of the circuit of FIG. 4 at selected times.

Referring to FIGS. 3 to 5 and first to FIG. 3, another embodiment of the present invention is shown as applied to a digital exposure control system which displays the exposure value in the digital form. In this system, information representative of the brightness of a scene as sensed by a light-sensitive element such as a silicon photo-diode in a TTL-metering manner in a block 101 is applied to a logarithmic compression circuit 102 and therefrom to an analogue-to-digital converter 103. Digital brightness information is combined with digital information representative of film speed and diaphragm aperture opening in a computer of blocks 104 and 105 with a pair of coding circuits 106 and 107 to produce digital information representative of a correct exposure value, in this instance, automatic shutter speed value which is then applied to and stored in a register 108. The system further includes a shutter control circuit which comprises a comparator 109 selectively responsive to the outputs of register 108 and a third coding circuit 113 of manual setting of shutter speed in the digital form for comparing the selected output with an output of a counter 111 associated with a clock pulse generator 110 upon coincidence of the compared outputs in the number of pulses counted with each other to actuate a driver 116 for a shutter electromagnet 117. The automatic and manual shutter speed values can be selectively displayed in the digital form by an indicator 115.

Connected between resistor 108 and a decoder 114 for the indicator 115 is a first gate circuit with three NAND gates NAND 4 to NAND 6 each having one input terminals connected to the register 108 and having output terminals connected through respective NAND's 7 to 9 to the decoder 114, while each of the other input terminal of NAND's 4 to 6 is connected directly to the output terminal of a frequency divider 112. A second gate circuit is provided with three NAND gates NAND 1 to NAND 3 each having one input terminal connected to the coding circuit 113 and having output terminals connected through the respective common NAND's 7 to 9 of the first gate circuit to decoder 114, while the other input terminals of NAND's 1 to 3 are connected through a common inverter Inv to the output terminal of frequency 112. With this gate circuit arrangement, it is possible for indicator 115 to display the automatic and manual shutter speed values alternately in sequence each value for a time interval of one second, for example, as the frequency divider 112 is associated with the common clock pulse generator 110 of the shutter control circuit to produce a pulse train at a frequency of 0.5/second. To bring about correct adjustment of shutter speed and diaphragm aperture in conformity with the prevailing scene brightness, the photographer may turn a shutter speed setting member to follow up the automatic shutter speed value while looking through the viewfinder. It is to be noted that when the setting member is moved from its "A" position for automatic shutter speed, register 108 is electrically cut off from comparator 109, and instead coding circuit 113 is brought into connection therewith.

FIG. 4 shows the details of the blocks of FIG. 3, each of which will be explained below, and wherein the same reference numerals have been employed to denote similar parts to those shown in FIG. 3.

Blocks 101 and 102 are comprised of a voltage source 200, a light sensitive element 202 arranged to receive light from a scene being photographed through an objective lens, an operational amplifier 204 having two input terminals (+) and (−) between which the element 202 is connected, and a diode 206 connected in the feedback path of the amplifier 204 to logarithmically compress the intensity of photo-current of element 202.

Block 103 includes an operational amplifier 212 having a non-inversion input connected to a point on connection between resistors 208 and 210 through which the output of amplifier 204 is grounded, and having an inversion input to which a digital output signal of a three-bit binary counter 222 after converted by a ladder resistor circuit 224, 226 and 228 to an analogue signal is applied through a resistor 214, a feedback resistor 216 connected between the inversion input and the output of amplifier 212, a transistor 218 having a base electrode connected to the output of amplifier 212, having an emitter electrode grounded, and having a collector electrode connected both to a voltage source Vcc through a resistor 220 and to a "reset" terminal of an R-S flip-flop 236, the set terminal of which is connected through a mono-stable multivibrator 234 to a point on connection between a light measuring control switch 231 and a resistor 232. An output terminal Q of R-S flip-flop 236 is connected through a clock pulse generator 238 to the input terminal INB of binary counter 222. The resistors 224, 226 and 228 are weighted 1, 2 and 4 respectively. The other output terminal $\bar{Q}$ of R-S flip-flop 236 is connected to one terminals of AND gates 240, 242 and 244, the other output terminals of which are connected to the respective output stages B, C and D of counter 222.

Block 104 is an adder having three pairs of input terminals, ones of which, namely, A1, A2 and A3 are connected to the respective output terminals of AND gates 240, 242 and 244, and the other ones B1, B2 and B3 which are connected to respective digit stages of a three-bit coding switch 106 for storing the least, central and most significant digits of a multidigit number corresponding to a film speed value preset in the manually adjustable film speed setting component. Adder 104 has three output terminals Σ1, Σ2 and Σ3 connected to respective one input terminals of AND gates 246, 248 and 250, the other input terminals of which are connected through a common delay circuit 245 to the output terminal $\bar{Q}$ of R-S flip-flop 236.

Block 105 is a subtractor having three pairs of input terminals, ones of which, namely, A1, A2 and A3 are connected to the respective output terminals of AND gates 246, 248 and 250, and the other ones B1, B2 and B3 which are connected to respective digit stages of a three-bit coding switch 107 for storing the least, central and most significant digits of a multidigit number corresponding to a diaphragm value preset in the manually adjustable diaphragm aperture setting component, or diaphragm ring.

Block 108 is a three-bit register of the parallel input type having a preset enable input connected through a second delay circuit 252 to the output of the first delay circuit 245. Register 108 has three digit stages having inputs A, B and C connected to the respective outputs Σ1, Σ2 and Σ3 of subtractor 105 and having outputs Aout, Bout and Cout connected to indicator 115 through the first gate circuit of NAND's 4 to 6 and to a multiplexer 109 through AND gates 260, 262 and 264.

Block 113 is a coding switch associated with a manually adjustable shutter speed setting component or shutter speed dial and having three digit stages 113a, 113b and 113c for storing the least, central and most significant digits of a multidigit number corresponding to a shutter speed value preset in the shutter dial. The digit stages 113a, 113b and 113c are connected not only to the second gate circuit of NAND's 1 to 3 through respective AND gates 254, 256 and 258 but to multiplexer 109 through respective AND gates 266, 268 and 270. Selective gating of these three groups of AND gates, 260 to 264, 254 to 258, and 266 to 270 is controlled in such a manner that when the shutter dial is moved from "A" position to "M" position with simultaneous opening of a switch 286 connected between the voltage source Vcc and a resistor 288, register 108 is cut off from multiplexer 109, and instead coding switch 113 is brought into connection therewith. 290 is an inverter connected between a common lead of the gating control inputs of AND gates 260 and 264 and a point on connection between switch 286 and resistor 288.

Block 111 is a binary counter having eight stages A to D and A2 to D2 connected to respective data inputs $D_0$ to $D_7$ of multiplexer 109 and having an input connected to clock pulse generator 110 through an AND gate 280. The gating control input of AND gate 280 is connected to an output Q of a flip-flop 278 which has an input D connected to an output Q of an R-S flip-flop 276. Flip-flop 276 has a clock pulse input CL connected to pulse generator 110 and a "set" input S connected to a point on connection between a switch 272 and a resistor 274. Switch 272 is arranged to be closed when a shutter release button is depressed. A switching transistor 282 controlling actuation of an electromagnet 284 for the leading shutter curtain is connected at its base electrode to the output Q of flip-flop 276.

Block 112 is a frequency divider for providing a pulse train with a period of frequency of 2 second as the clock pulse generator 110 produces a pulse train at a frequency of 512 Hz. The output of frequency divider 112 is applied both to the first gate circuit NAND's 4 to 6 and to the second gate circuit NAND's 1 to 3 through an inverter Inv, so that when the shutter dial is out of "A" position to close switch 286, indicator 115 is permitted to display the automatic exposure value of register 108 and the manual exposure value of coding switch 113 alternately and successively in such a manner that seven display elements 115a to 115g are selectively acted on one at a time depending upon the multidigit number applied to indicator 115 after decoded by a decoder 114. A list of multidigit numbers related to the available shutter speed values and the selected display elements is given in the following table.

| Shutter speed (sec.) | Multidigit number | Display element lighted-on |
|---|---|---|
| 1/512 | 1 0 0 | 115a |
| 1/256 | 0 1 0 | 115b |
| 1/128 | 1 1 0 | 115c |
| 1/64 | 0 0 1 | 115d |
| 1/32 | 1 0 1 | 115e |
| 1/16 | 0 1 1 | 115f |
| 1/8 | 1 1 1 | 115g |

The operation of the system of FIGS. 3 and 4 will next be explained by reference to the timing chart of FIG. 5. When a not shown power switch is closed to render all the sections of the system operative, photosensitive element 202 generates a signal with magnitude proportional to the brightness of a scene being photographed which after logarithmically compressed by diode 206 is applied to the non-inversion input terminal (+) of operational amplifier 212. At a time when the light measurement control switch 231 is closed, monostable multivibrator 234 is supplied with a trigger signal of waveform shown on line (a) in FIG. 5, and in turn produces a pulse shown on line (b) which is applied to "set" input terminal S of flip-flop 236. In synchronism with the tailing edge of the pulse, the outut Q of flip-flop 236 is inverted from a low level (hereinafter abbreviated as "0") to a high level (hereinafter abbreviated as "1") at which pulse generator 238 starts to oscillate with production of pulses of short duration shown on line (d) in FIG. 5. As the number of clock pulses counted by binary counter 222 is increased, the voltage across resistor 230 is increased in a stepping manner as shown on line (e).

Upon coincidence of the output voltages of this resistor 230 and the sensor circuit 101, 102 as detected by operational amplifier 212 constituting part of a comparator, transistor 218 is turned from the conducting to the non-conducting state as shown on line (f), causing R-S flip-flop 236 to be reset. At this time, the duration of oscillation of generator 238 is terminated because of the inversion of the output Q of flip-flop 236 from "1" to "0", so that the final number of pulses counted is stored in counter 222. Upon resetting of flip-flop 236 as shown on line (g), AND gates 240, 242 and 244 are gated on to pass digital information representative of the scene brightness therethrough from the digit stages B, C and D to the respective inputs A1, A2 and A3 of adder 104. During a time interval, $dt_1$, independent upon the parameters of delay circuit 245 as shown on line (h), computation for adding the brightness value to the film speed value is performed. At the termination of duration of the time interval, $dt_1$, AND gates 246, 248 and 250 are gated on to apply the output of adder 104 to subtractor 105 in which subtracting computation is performed based on the formula $Bv+Sv-Av = Tv$ inasmuch as a desired diaphragm value is set into coding switch 107, during a time interval, $dt_2$, dependent upon the second delay circuit 252 as shown on line (j). At the termination of duration of the second time interval, $dt_2$, "1" signal is applied to the preset enable terminal of register 108, thereby the exposure value or automatic shutter speed value is stored in register 108 and further directed therefrom to the indicator 115 through the first gate circuit of NAND's 4 to 6.

On the other hand, the photographer will turn the shutter dial to follow up the automatic shutter speed value while looking through the finder. During this setting procedure, the first and second gate circuit of NAND's 1 to 6 are alternately acted on in sequence so that on assumption that the automatic shutter speed value is 1/256 second, while the manual shutter speed value is 1/512 second, two display elements 115a and 115b are lighted on alternately in sequence. To attain correct adjustment of the shutter dial based on the exposure value in conformity with the scene brightness, therefore, the photographer need only to further turn the shutter dial until only one display element is allowed to be lighted on continuously.

As the shutter dial is set out of "A" position, that is, to a position for a shutter speed value of 1/256 second, register 108 is cut off from multiplexer 109, but instead coding switch 113 is connected thereto. In this case, the inputs A, B and C of multiplexer 109 are supplied with respective signals of "0", "1" and "0" respectively. When a not shown release button is depressed, switch 272 is opened to apply a "1" signal to "set" terminal of flip-flop 276. Upon advent of a first pulse on "CL" terminal of F.F. 276 from clock pulse generator 110, therefore, in synchronism with the tailing edge of the first pulse, F.F. 276 is inverted to produce a "1" output appearing at terminal Q thereof and which is applied both to "D" input terminal of F.F. 278 and to the base of pnp transistor 282. At this time, the leading shutter curtain starts to run down to the exposure aperture fully open position. On the other hand, from this time on, F.F.278 remains unactuated by "1" output of F.F.276 as no "1" input appears at the terminal $T_0$ of F.F.278. In synchronism with the leading edge of a second pulse, however, F.F.278 is inverted to produce a "1" output which is then applied through AND gate 280 to binary counter 111 in which the first digit stage becomes "1" in synchronism with the tailing edge of the second pulse. Upon advent of a third pulse on F.F.278, multiplexer 109 is operated to have (0, 1, 0) in synchronism with the tailing edge of the third pulse. Because of its data select inputs having (0, 1, 0), the ouput W of multiplexer 109 becomes "0" to de-energize electromagnet 117 for the tailing shutter curtain. Before the initiation of exposure, it is of course necessary to adjust the diaphragm mechanism to a presetting made on coding switch 107. But the present invention is not essentially related to the control of the diaphragm mechanism. Therefore, the detailed explanation therefor has been omitted.

As described above, even in the second embodiment of the invention, manual settings of necessary exposure factors can be performed without the necessity of removing the eye from the eye-piece of the finder despite of the fact that the exposure factor setting device itself is of simple structure likewise as in the first embodiment.

What is claimed is:

1. An exposure factors setting device for a camera having a manual exposure mode for controlling exposure time and an aperture size in accordance with a shutter speed and a diaphragm aperture which are manually adjusted, the exposure factor setting device comprising:
  (a) light sensitive means for producing a first electrical signal corresponding to the brightness of a scene being photographed;
  (b) first exposure factor setting means for producing a second electrical signal corresponding a first exposure factor manually set;
  (c) a computer circuit response to said first and said second electrical signals for producing a third electrical signal corresponding to a second exposure factor capable of providing a correct exposure;
  (d) second variable exposure factor setting means for producing a changeable fourth electrical signal corresponding to an exposure factor to be manually set and of the same kind as that of said second exposure factor;
  (e) exposure factor indicating means; and
  (f) first means for transferring the third electrical signal from said computer circuit and the fourth electrical signal from said second variable exposure factor setting means to said exposure factor indicating means during manual adjustment of the shutter speed and the diaphragm aperture in the manual exposure mode so said second variable exposure factor setting means may be varied until coincidence of the display content of the exposure factor indicating means is attained.

2. An exposure factors setting device according to claim 1, wherein said first means includes:
(a) a first gate circuit connected between said computer circuit and said exposure factor indicating means;
(b) a second gate circuit connected between said second variable exposure factor setting means and said exposure factor indicating means; and
(c) a pulse generator having two output terminals, one of which is connected to said first gate circuit for controlling gating on and off of the first gate circuit and the other of which provides an output signal of the opposite phase to that of the first-named output terminal and which is connected to said second gate circuit for controlling gating on and off of said second gate circuit.

3. An exposure factors setting device for a camera comprising:
(a) light sensitive means for producing a first electrical signal corresponding to the brightness of a scene being photographed;
(b) first exposure factor setting means for producing a second electrical signal corresponding a first exposure factor manually set;
(c) a computer circuit responsive to said first and said second electrical signals for producing a third electrical signal corresponding to a second exposure factor capable of providing a correct exposure;
(d) second variable exposure factor setting means for producing a fourth electrical signal corresponding to an exposure factor to be manually set and of the same kind as that of said second exposure factor;
(e) exposure factor indicating means;
(f) first means for transferring the third electrical signal from said computer circuit and the fourth electrical signal from said second variable exposure factor setting means to said exposure factor indicating means alternately, whereby said second variable exposure factor setting means is varied until the coincidence of display content of the exposure factor indicating means is attained,
(g) a first gate circuit provided in the data path line between said computer circuit and said exposure factor indicating means;
(h) a second gate circuit provided in a data path between said variable exposure factor setting means and said exposure factor indicating means;
(i) a pulse generator;
(j) an inverting circuit; and
(k) an frequency divider having an input terminal connected to said pulse generator for dividing the frequency of pulses from said pulse generator and having an output terminal connected directly to said first gate circuit for gating on and off said first gate circuit in response to the divided pulses and also connected through said inverting circuit to said second gate circuit for gating on and off said second gate circuit in response to the divided pulses.

4. An exposure factors setting device according to claim 2, wherein said pulse generator is formed by an astable multivibrator.

5. An exposure factors setting device according to claim 4, wherein said first gate circuit includes a switching element having a control electrode connected to one of the output terminals of said astable multivibrator.

6. An exposure factors setting device according to claim 5, wherein said switching element is formed by a transistor.

7. An exposure factors setting device according to claim 6, wherein said transistor is an npn type transistor.

8. An exposure factors setting device according to claim 4, wherein said second gate circuit includes a switching element having a control electrode connected the other output terminal of said astable multivibrator.

9. An exposure factors setting device according to claim 8, wherein said switching element is formed by a transistor.

10. An exposure factors setting device according to claim 9, wherein said transistor is an npn type transistor.

11. An exposure factors setting device according to claim 1, wherein said exposure factor indicating means is a meter.

12. An exposure factors setting device for a camera comprising:
(a) light sensitive means for producing a first electrical signal corresponding to the brightness of a scene being photographed;
(b) first exposure factor setting means for producing a second electrical signal corresponding a first exposure factor manually set;
(c) a computer circuit responsive to said first and said second electrical signals for producing a third electrical signal corresponding to a second exposure factor capable of providing a correct exposure;
(d) second variable exposure factor setting means for producing a fourth electrical signal corresponding to an exposure factor to be manually set and of the same kind as that of said second exposure factor;
(e) exposure factor indicating means, and
(f) first means for transferring the third electrical signal from said computer circuit and the fourth electrical signal from said second variable exposure factor setting means to said exposure factor indicating means alternately, whereby said second variable exposure factor setting means is varied until the coincidence of display content of the exposure factor indicating means is attained,
said exposure factor indicating means including a meter, said second variable exposure factor setting means being varied until the flickering of the pointer of said meter stops.

13. An exposure factors setting device according to claim 1, wherein said exposure factor indicating means includes a plurality of indicating elements selectively lighted on in response to input signal.

14. An exposure factors setting device for a camera having a manual exposure mode for controlling exposure time and an aperture size in accordance with a shutter speed and a diaphragm aperture which are manually adjusted, the exposure factor setting device comprising:
(a) light sensitive means for producing a first electrical signal corresponding to the brightness of a scene being photographed;

(b) aperture size setting means for producing a second electrical signal corresponding to an aperture size value manually set;
(c) a computer circuit responsive to said first and said second electrical signals for producing a third electrical signal corresponding to a shutter speed value capable of providing a correct exposure;
(d) variable shutter speed setting means for producing a fourth electrical signal corresponding to a shutter speed value manually set;
(e) indicating means for indicating shutter speed value; and
(f) gate means for transferring said third electrical signal from said computer circuit and said fourth electrical signal from said variable shutter speed setting means alternately to said indicating means during manual adjustment of the shutter speed and the diaphragm aperture in the manual exposure mode so that said variable shutter speed setting means may be varied until the coincidence of display content of said indicating means is attained.

15. An exposure factor setting device for a camera having a manual exposure mode for controlling exposure time and an aperture size in accordance with a shutter speed and a diaphragm aperture which are manually adjusted, the exposure factor setting device comprising:
(a) light sensitive means for producing a first electrical signal corresponding to the brightness of a scene being photographed;
(b) first exposure factor setting means for producing a second electrical signal corresponding to a first exposure factor manually set;
(c) a computer circuit responsive to said first and second electrical signals for producing a third electrical signal corresponding to a second exposure factor capable of providing a correct exposure;
(d) second variable exposure factor setting means for producing a changeable fourth electrical signal corresponding to an exposure factor which is to be manually set and is of the same kind as that of said second exposure factor;
(e) exposure factor indicating means;
(f) a first gate circuit provided in a data path line between said computer circuit and said exposure factor indicating means;
(g) a second gate circuit provided in a data path between said variable exposure factor setting means and said exposure factor indicating means;
(h) a pulse generator;
(i) an inverting circuit; and
(j) a frequency divider having an input terminal connected to said pulse generator for dividing the frequency of pulses from said pulse generator and having an output terminal connected directly to said first gate circuit for gating on and off said first gate circuit in response to the divided pulses and also connected through said inverting circuit to said second gate circuit for gating on and off said second gate circuit in response to the divided pulses.

16. An exposure factor setting device for a camera having a manual exposure mode for controlling exposure time and an aperture size in accordance with a shutter speed and a diaphragm aperture which are manually adjusted, the exposure factor setting device comprising:
(a) light sensitive means for producing a first electrical signal corresponding to the brightness of a scene being photographed;
(b) first exposure factor setting means for producing a second electrical signal corresponding to a first exposure factor manually set;
(c) a computer circuit responsive to said first and second electrical signals for producing a third electrical signal corresponding to a second exposure factor capable of providing a correct exposure;
(d) second variable exposure factor setting means for producing a changeable fourth electrical signal corresponding to an exposure factor which is to be manually set and is of the same kind as that of said second exposure factor;
(e) an exposure factor indicating meter; and
(f) change over means for alternately transferring the third electrical signal from said computer circuit and the instantaneous fourth electrical signal from said second variable exposure factor setting means to said exposure factor indicating meter during the manual adjustment of the shutter speed and diaphragm aperture in the manual exposure mode, whereby said second variable exposure factor setting means is varied until the flickering of the pointer of said meter stops.

* * * * *